2,886,560
POLYMERIZATION OF ETHYLENE

Heinz Weber, Ludwigshafen (Rhine), Hans Boehm, Speyer, Georg Schiller, Mannheim, and Karl Stange, Wesseling, Germany, assignors to Badische Anilin- & Soda-Fabrik Aktiengesellschaft, Ludwigshafen (Rhine), Germany No Drawing. Application November 28, 1955
Serial No. 549,504

Claims priority, application Germany November 27, 1954

3 Claims. (Cl. 260—94.9)

This invention relates to the production of high molecular weight polyethylene in the presence of catalysts.

It has already been proposed to polymerize ethylene with the aid of a mixed catalyst of aluminum chloride, titanium tetrachloride and aluminum. By this process solid polymerization products are obtained. In the absence of titanium tetrachloride only oily products are formed. During the polymerization reaction of ethylene in the presence of aluminum and aluminum chloride halogen-containing aluminum alkyls are formed (Hall and Nash, J. Inst. Petrol. Techn. 24, 471/95 (1938)).

We have now found, that the properties of high molecular weight and film forming polyethylene can easily be modified by polymerizing ethylene in the presence of a titanium halide in combination with a previously formed halogen-containing aluminum alkyl.

Especially suitable titanium halides are titanium trichloride, titanium tetrachloride, titanium oxychloride and the corresponding bromides. Titanium trichloride is advantageously prepared by reduction of titanium tetrachloride with hydrogen. Among suitable aluminum compounds there may be mentioned in particular mixtures of diethyl aluminum monochloride and monoethyl aluminum dichloride, particularly their mixtures in equimolecular proportions, for example ethyl aluminum sesquichloride and the components of the same. Ethyl aluminum sesquichloride can be prepared according to Grosse and Mavity, J. Organ. Chem. 5, 106 (1940).

The catalysts can be prepared for example by the slow addition of a solution of a titanium tetrahalide to a solution of a halogen-containing aluminum alkyl, if necessary while cooling with ice and stirring. A suspension is obtained which can be introduced into the reaction vessel with the exclusion of air. It is also possible to prepare the suspension in the reaction vessel. Suitable solvents for the titanium halides are for example aliphatic or saturated cyclic hydrocarbons, as for example pentane, octane, cyclohexane or heavy gasoline. The halogen-containing aluminum alkyls can also be dissolved in the said liquids which preferably are purified and dried.

A ratio of about 0.3 to 2.5 mols, preferably of 0.5 to 0.8 mol of a titanium halide to 1 mol of the halogen-containing aluminum alkyl compound is most effective. To a great extent the molecular weight of the polyethylene and the polymerization speed are dependent on the molar ratio in which the components forming the catalyst have been brought together. By increasing the proportion of titanium halide in the mixed catalyst the molecular weight of the polyethylene is lowered, while the polymerization speed is raised. The activity of the catalyst can be increased by heating the mixture of a titanium halide and the halogen-containing aluminum alkyl before adding the ethylene.

With such a catalyst ethylene can be polymerized rapidly at normal pressure. It may be advantageous to polymerize at a moderately increased pressure, as for example up to 200 atmospheres, preferably 1–100 atmospheres. By this it is possible to influence the molecular weight and the space time yield. In general the process is carried out at temperatures of from about 0° to 150° C., preferably from 10° to 100° C., but it is also possible to work at lower or higher temperatures, for example up to 200°C.

The ethylene which preferably is highly concentrated, for example of 99.2 to 99.8 percent strength, can be purified with potassium vapor by freezing, by washing with organo-aluminum compounds or with zinc alkyls or also by passing the ethylene over the heated copper catalyst. It is of special advantage to dissolve or suspend the catalyst in an anhydrous organic liquid and then to feed in ethylene in a state of fine dispersion. A suspension of polyethylene is obtained. When working at moderately increased pressure, the polymerization can be conducted batchwise in autoclaves or continuously by pressing the ethylene into the lower part of a reaction tube and withdrawing the resultant polymer suspension in a direction counter-current or co-current therewith. It is also possible to spray the catalyst into the reaction vessel and to allow the reaction to proceed throughout the whole volume of the reaction vessel. The polyethylene can be purified by washing for example with water, organic liquids, as for example methanol, or solutions of acids in water or organic solvents, as for example hydrochloric acid in methanol, and thus stripped of catalyst components. Its strength properties are improved if it is carefully heated in vacuo.

Ethyl aluminum chlorides have already been proposed for polymerizing ethylene. These catalysts, however, only yield liquid polymers. It has also been proposed to polymerize ethylene with halogen-free metal alkyls, as for example aluminum triethyl. Depending on the experimental conditions, there are thereby formed low molecular weight unitary olefines together with soft or hard paraffin wax or film-forming polyethylene. In the latter case it is necessary to use very high pressures, up to about 2,000 atmospheres, but the polymerization in this case proceeds at a relatively slow rate.

The following examples will further illustrate this invention and how the same is to be carried out in practice but the invention is not restricted to these examples. The parts are parts by weight.

Example 1

To 140 parts of octane 0.26 part of titanium tetrachloride and 0.45 part of ethyl aluminum sesquichloride (molar ratio Ti:Al=0.38) are added with the exclusion of oxygen and moisture and the mixture is heated to 50° C. for 30 minutes while nitrogen free of oxygen is passed through. Then 12 parts of dry ethylene free of oxygen are fed in per hour with intense agitation, the reaction occurring immediately with a rapid rise in temperature. By cooling a temperature of between 50° and 55° C. is maintained. After some time the absorption which is quantitative at first falls off gradually. The unreacted portion of the ethylene is recirculated with the feed of the fresh gas being cut down proportionally. After about 6 hours the resultant polymer is separated, washed and dried, 42 parts of a white pulverulent polyethylene having a melting point of 133.5° C. being obtained. At this temperature the crystalline portions will vanish in the polarized light. The tensile strength is 409 kilograms per square centimeter with reference to the initial cross section of the sample. The conventional viscosity in para-diisopropylbenzene at 150° C. is 0.340 according to G. V. Schulz (Makromolekulare Chemie 13 (1954), pages 71–74 (l./g.)).

Example 2

Using a catalyst of 0.28 part of titanium tetrachloride and 0.30 part of ethyl aluminum sesquichloride (molar ratio of Ti:Al=0.6), ethylene is polymerized as described in Example 1. After 6 hours 42 parts of a white pulverulent polyethylene are obtained, the polyethylene having a melting point of 130.5° C. and a tensile strength of 401 kilograms per square centimeter. The conventional viscosity is 0.265 measured by the method of G. V. Schulz.

Example 3

To 140 parts of octane 0.40 part of titanium tetrachloride and 0.37 part of ethyl aluminum sesquichloride are added with the exclusion of oxygen and moisture and the mixture is heated to 50° C. nitrogen free of oxygen being passed through. Then dry ethylene which is free of oxygen is fed in with vigorous agitation at a rate of 12 parts per hour, the nitrogen current being cut down simultaneously. The reaction occurs immediately with a marked rise in the temperature of the reaction mixture. By cooling a temperature of between 50° and 55° C. is maintained. After some time the absorption of gas which was quantitative at the start abates gradually. The escaping ethylene is recirculated, the feed of the fresh gas being cut down proportionately. After about 6 hours the resultant polymer is separated, washed and dried, the yield being 42 parts of a white pulverulent polyethylene which has a melting point of 124° C. and a tensile strength of about 200 kilograms per square centimeter. The conventional viscosity is 0.188 measured by the method of G. V. Schulz.

Example 4

A solution of 5.7 parts of titanium tetrachloride in 5 parts of pentane is added to a solution of 6 parts of ethyl aluminum sesquichloride in 35 parts of pentane at room temperature and the mixture is stirred for 60 minutes. The resultant suspension is fed into an autoclave. Into this autoclave 392 parts of ethylene are pressed at a low rate at a pressure of 50 atmospheres and the autoclave is then heated to 50° C. unless the reaction occurs spontaneously.

260 parts of solid polyethylene are obtained. The polymer has a melting point of 128° C. and a conventional viscosity of 0.38 measured by the method of G. V. Schulz.

Example 5

A catalyst consisting of 0.49 part of titanium tetrachloride and 0.43 part of diethyl aluminum monochloride is prepared in the manner described in Example 3. Then 12 parts of ethylene are fed in per hour, the unconverted gas being recirculated. After 6 hours 36 parts of polyethylene are obtained which has a melting point of 133° C. and a tensile strength of 350 kilograms per square centimeter. The conventional viscosity is 0.31 measured by the method of G. V. Schulz.

We claim:

1. A process for the polymerization of gaseous ethylene in the presence of a polymerization catalyst which comprises polymerizing the gaseous ethylene at a temperature from 10–100° C. and a pressure of 1–100 atmospheres absolute in the presence of a catalytic amount of a mixed catalyst of ethyl aluminum sesquichloride and titanium tetrachloride having a ratio of about 0.5–0.8 mol of titanium tetrachloride per mol of ethyl aluminum sesquichloride.

2. A process for the polymerization of gaseous ethylene in the presence of a polymerization catalyst which comprises polymerizing the gaseous ethylene at a temperature from 10–100° C. and a pressure of 1–100 atmospheres absolute in the presence of a catalytic amount of a mixed catalyst of ethyl aluminum sesquichloride and titanium tetrachloride having a ratio of about 0.3–2.5 mol of titanium tetrachloride per mol of ethyl aluminum sesquichloride.

3. A process for the polymerization of gaseous ethylene in the presence of a polymerization catalyst which comprises polymerizing the gaseous ethylene at a temperature between 0 and 150° C. and a pressure of 1–100 atmospheres absolute in the presence of a catalytic amount of a mixed catalyst of an ethyl aluminum chloride and titanium tetrachloride having a ratio of 0.3–2.5 mols titanium tetrachloride per mol of the ethyl aluminum chloride.

References Cited in the file of this patent

UNITED STATES PATENTS

| 2,721,189 | Anderson et al. | Oct. 18, 1955 |

FOREIGN PATENTS

| 534,792 | Belgium | Jan. 31, 1955 |
| 502,597 | Canada | May 18, 1954 |
| 533,362 | Belgium | May 16, 1955 |

Disclaimer 2,886,560.—*Heinz Weber*, Ludwigshafen (Rhine), *Hans Boehm*, Speyer, *Georg Schiller*, Mannheim, and *Karl Stange*, Wesseling, Germany. POLYMERIZATION OF ETHYLENE. Patent dated May 12, 1959. Disclaimer filed Sept. 11, 1962, by the assignee, *Badische Anilin- & Soda-Fabrik Aktiengesellschaft*.

Hereby enters this disclaimer to claim 3 of said patent.

[*Official Gazette October 16, 1962.*]